April 16, 1963

D. H. CHARLESWORTH 3,085,961

MEANS FOR DETECTING INSULATION FAILURE
IN REACTOR PRESSURE TUBES

Filed May 29, 1959

INVENTOR
Donald H. Charlesworth

BY Alex. E. MacRae

ATTORNEY

United States Patent Office 3,085,961
Patented Apr. 16, 1963

3,085,961
MEANS FOR DETECTING INSULATION FAILURE IN REACTOR PRESSURE TUBES
Donald H. Charlesworth, Deep River, Ontario, Canada, assignor to Atomic Energy of Canada Limited, Ottawa, Ontario, Canada, a corporation
Filed May 29, 1959, Ser. No. 816,949
4 Claims. (Cl. 204—193.2)

This invention relates to a method and means for detecting insulation failure in reactor pressure tubes.

Thermal insulation between the unpressurized heavy water moderator and the high pressure, high temperature coolant of power reactors using the pressure tube concept is required to prevent excessive heat losses to the moderator. Such heat losses lower the overall thermal efficiency of the reactor and also require a higher capacity cooling system for the moderator. Internal thermal insulation has the additional purpose of restricting the pressure-tube temperature to a value not much greater than the moderator temperature. This low tube-wall temperature can be used to improve the performance of the reactor by permitting either higher operating pressures or thinner-walled pressure tubes.

Failure of such insulation allows the pressure-tube temperature to rise and may therefore have serious consequences and it is highly desirable that, when failure occurs, it be detected immediately.

An object of the invention is to provide a simple, convenient and effective method and apparatus for detecting failures in the insulation body in pressure tubes of power reactors.

Figure 1:
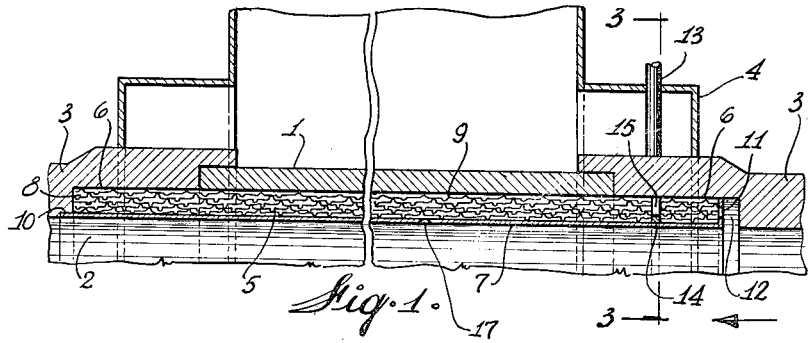
Figure 2:
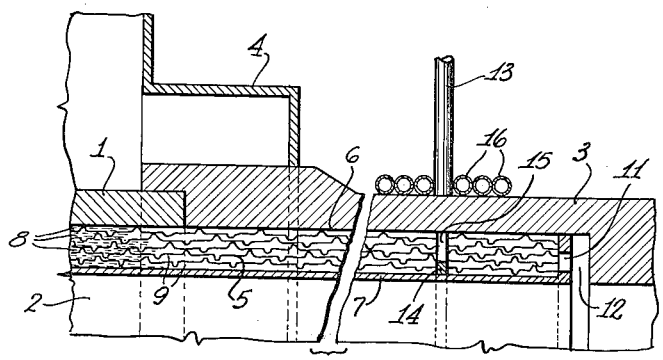
Figure 3:
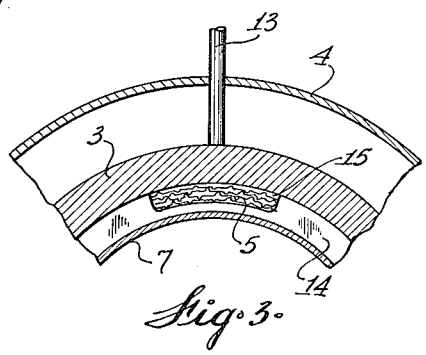

The invention will be described with reference to the accompanying drawing, in which:

FIGURE 1 is a partial sectional elevation of a pressure tube with associated elements and having incorporated therewith apparatus in accordance with the present invention, FIGURE 2 is a partial sectional elevation of a pressure tube with associated elements and having incorporated therewith a somewhat modified apparatus in accordance with the present invention, and FIGURE 3 is a section on line 3—3 of FIGURE 1.

In the drawing, 1 is a metal pressure tube of a power reactor providing the usual coolant channel 2 arranged to receive a body of fissionable material, 3 is a metal pressure tube extension at each end of the tube, 4 are the calandria walls of the moderator surrounding the tube 1 and portions of the extensions 3, 5 is an annular body of insulation lining the entire interior surface of the tube 1 and extending into recesses 6 in the tube extensions, and 7 is a cylindrical relatively thin-walled metal liner extending the full length of the insulation body and between which and the tube the insulation body is located.

The body of insulation 5 may comprise layers 8 of stagnant water provided by a spirally wound sheet or sheets of dimpled metal foil 9, the layers 8 being sufficiently thin to suppress free convection therein.

In order to prevent flow through the insulating space under normal circumstances under the influence of the axial pressure gradient existing in the main coolant flow in channel 2, the downstream end of the liner 7 is sealed to the pressure tube extension 3 at 10.

The upstream end of the insulation body is provided with an annular vent 11 which communicates with channel 2 via space 12 in recess 6, in order that the insulation be at the same pressure as the upstream coolant.

The most probable types of serious failure of the insulation are either perforation of the linear, such as indicated at 17, as a result of corrosion or galling by sliding fuel bundles, or leakage of the seal 10. The occurrence of either would result in a flow of hot coolant through insulation body 5, such flow entering the body at vent 11.

Since the vent 11 is at the upstream end of the insulation body, the flow of coolant through the perforation of the liner will be in the safe direction, i.e., from the insulation space 5 to the coolant channel 2, and not in the reverse direction which would lead to a hot spot in the pressure tube.

The flow of hot coolant through the insulation body will result in an increase above normal of the temperature of the pressure tube or its extensions. A temperature-sensing device, such as a thermocouple 13, is provided to detect such temperature increase. As shown in FIGURE 1, the thermocouple is mounted on the tube extension 3 adjacent vent 11 and extends through the calandria wall, whereby the moderator provides cooling to set up the necessary temperature gradient across the insulation.

In order to provide a more sensitive and effective instrument, it is quite desirable that the flow of hot coolant through the insulation body in response to a failure be localized. This may be effected by providing an annular member or ring 14 which divides the insulation body into two sections. As shown, the ring 14 is located in the tube extension in somewhat adjacent relation to the vent 11. The ring 14 has an aperture 15 therein, such aperture being of very minor circumferential extent. Thus, the ring constricts the flow of coolant through an opening the area of which may be not more than, for instance, one-tenth the total cross-sectional area of the insulation body.

As indicated in FIGURE 3, the thermocouple 13 is located in radially opposite relation to the aperture 15. However, the location of the thermocouple with respect to the aperture is subject to wide variation.

Referring to FIGURE 2, a somewhat modified arrangement is illustrated wherein the thermocouple 13 is located outside the calandria wall for more convenient access. In this instance, however, cooling such as by cooling coils 16 is required to set up the necessary temperature gradient.

The location of the constriction ring 14 within the tube extension also provides some protection against the effects of insulation failure. Since the pressure tube extensions are designed to withstand operation with the tube wall at full coolant temperature, whereas the pressure tube proper is not, the presence of a hot spot opposite the aperture 15 is of little consequence from a strength point of view. Since the present invention ensures that a hot spot resulting from a failure of the liner will occur in the extension rather than in the pressure tube itself, some protection of the pressure tube is obtained.

I claim:

1. In a power reactor having a pressure tube providing a coolant channel, a liner within said tube, and an annular body of insulation comprising stagnant layers of the coolant between said liner and said tube, apparatus for detecting failure in said body of insulation comprising means forming a vent leading from said channel to the upstream end of said insulation body, a ring in said insulation body dividing said body into two longitudinally aligned sections, said ring having an opening of minor circumferential extent providing constricted communication between said sections, said ring being otherwise imperforate to prevent fluid flow from one of said insulation body sections to the other except through said opening, and a temperature-sensing device mounted on said pressure tube in substantially opposed relation to said opening for determination of temperature changes therein.

2. Apparatus as defined in claim 1, said temperature-sensing device being located in adjacent relation to said constricted opening.

3. In a power reactor having a pressure tube providing a coolant channel a pressure tube extension at each end of said tube, calandria walls surrounding said pressure tube and portions of said tube extensions, a liner within said tube and tube extensions, and an annular body of insulation comprising stagnant layers of the coolant between said liner and said tube and tube extensions, apparatus for detecting failure in said body of insulation comprising means forming a vent leading from said channel to the upstream end of said insulation body, a ring adjacent said vent dividing said insulation body into two longitudinally aligned sections and having an opening therein of minor circumferential extent providing constricted communication between said sections, said ring being otherwise imperforate to prevent fluid flow from one of said insulation body sections to the other except through said opening, and a temperature-sensing device mounted on one of said tube extensions within said calandria wall and in adjacent relation to said constricted opening.

4. In a power reactor having a pressure tube providing a coolant channel, a pressure tube extension at each end of said tube, calandria walls surrounding said pressure tube and portions of said tube extensions, a liner within said tube and tube extensions, and an annular body of insulation comprising stagnant layers of the coolant between said liner and said tube and tube extensions, apparatus for detecting failure in said body of insulation comprising means forming a vent leading from said channel to the upstream end of said insulation body, a ring adjacent said vent dividing said insulation body into two longitudinally aligned sections and having an opening therein of minor circumferential extent providing constricted communication between said sections, said ring being otherwise imperforate to prevent fluid flow from one of said insulation body sections to the other except through said opening, a temperature-sensing device mounted on one of said tube extensions outside of said calandria walls and in adjacent relation to said constricted opening, and means for cooling the portion of said tube extension adjoining said temperature-sensing device.

References Cited in the file of this patent

UNITED STATES PATENTS

| | | |
|---|---|---|
| 2,037,813 | Munters | Apr. 21, 1936 |
| 2,658,728 | Evans | Nov. 10, 1953 |
| 2,817,499 | Harding et al. | Dec. 24, 1957 |
| 2,843,543 | Christy | July 15, 1958 |

FOREIGN PATENTS

| | | |
|---|---|---|
| 286,658 | Switzerland | Mar. 2, 1953 |
| 202,789 | Australia | Aug. 2, 1956 |